United States Patent Office 3,359,770
Patented Dec. 26, 1967

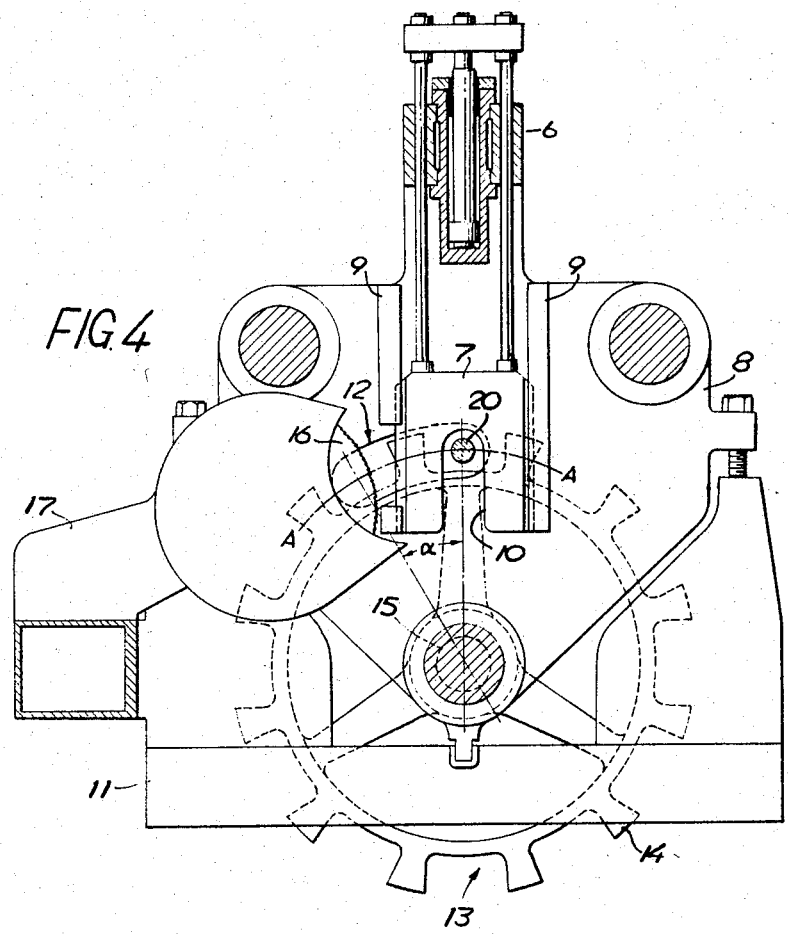

3,359,770
METHOD AND APPARATUS FOR CUTTING EX-
TRUDED MATERIALS ON MOVABLE CON-
TAINER TYPE METAL EXTRUDING PRESS
Akira Asari, Asahi-ku, Osaka, Japan, assignor to Kobe
Steel Ltd., Fukiai-ku, Kobe, Japan
Filed June 28, 1965, Ser. No. 469,366
Claims priority, application Japan, June 29, 1964,
39/37,140
3 Claims. (Cl. 72—255)

ABSTRACT OF THE DISCLOSURE

A metal extruding press of the type having a plurality of billet containers attached to a holder which moves the containers seriatim to an extrusion station, has heretofore required holding of the container at the extrusion station during severing of the extruded material from the remnant. The present disclosure avoids the delay of so doing by arranging for movement of the extruded metal with the container from the extruding station and for severing the extruded metal from the remnant during such movement.

This invention relates to a novel method and apparatus for cutting an extruded material upon the completion of extrusion on a movable container type metal extruding press having a plurality of billet containers attached to a single container holder so adapted that the movement of said container holder will cause the respective containers to be moved one after another toward the center axis of extrusion thereby providing for the extrusion of metal.

The extruding of metal in the form of a billet requires various working steps ranging from the charging of billets to the cleaning of the inner surface of each container. Therefore, if it is so arranged that these steps are separately performed at the respective container positions of the extruding press having a plurality of containers, the press cycle will be considerably reduced. However, in order that the extruded material alone, not together with the extrusion remnant, may be pulled forwardly of the container after previously cutting them apart, the cutting of the extruded material must be performed on the center axis of extrusion, whereby the reduction of the working steps performed on the center axis of extrusion is consequently limited.

With the view of reducing the working steps performed on the center axis of extrusion, the invention provides a method of cutting extruded materials comprising the steps of causing the extruded material to follow the movement of the container by the utilization of the movement of the container holder occurring at the end of extrusion, and cutting said extruded material by a stationary cutting machine in the course of its movement in a directional normal to the direction of extrusion. According to this method, since the extruded material is cut simultaneously with the movement of the container holder, the working time on the center axis of extrusion is correspondingly reduced.

An apparatus used for carrying out the method according to the invention is characterized in that an opposed frame sustaining the extrusion force is formed with an elongated opening extending in a direction parallel to the movement of the container holder, the extruded material being caused to be moved together with the container holder along said elongated opening, and the cutting blade of a stationary cutting machine is positioned adjacent the elongated opening so that the extruded material is cut by the cutting blade during the movement of the extruded material. The use of this apparatus makes it possible to embody the cutting method of the invention effectively.

The invention will now be described in more detail with reference to a preferred embodiment thereof shown in the accompanying drawings, in which:

FIG. 3 and FIG. 4 are sectional views taken along lines III—III and IV—IV in FIG. 1, respectively; and FIG. 5 is a longitudinal section of the apparatus with a container in its retracted position.

Figure 1:
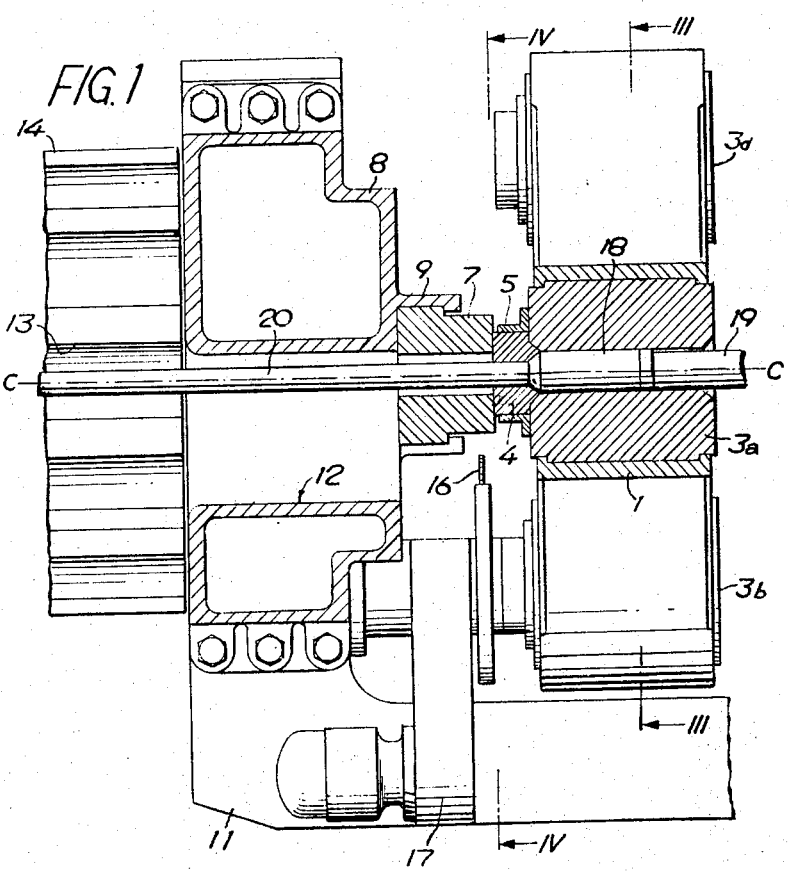
FIG. 1 is a sectional plan view of an apparatus taken along the center axis of extrusion.
Figure 2:
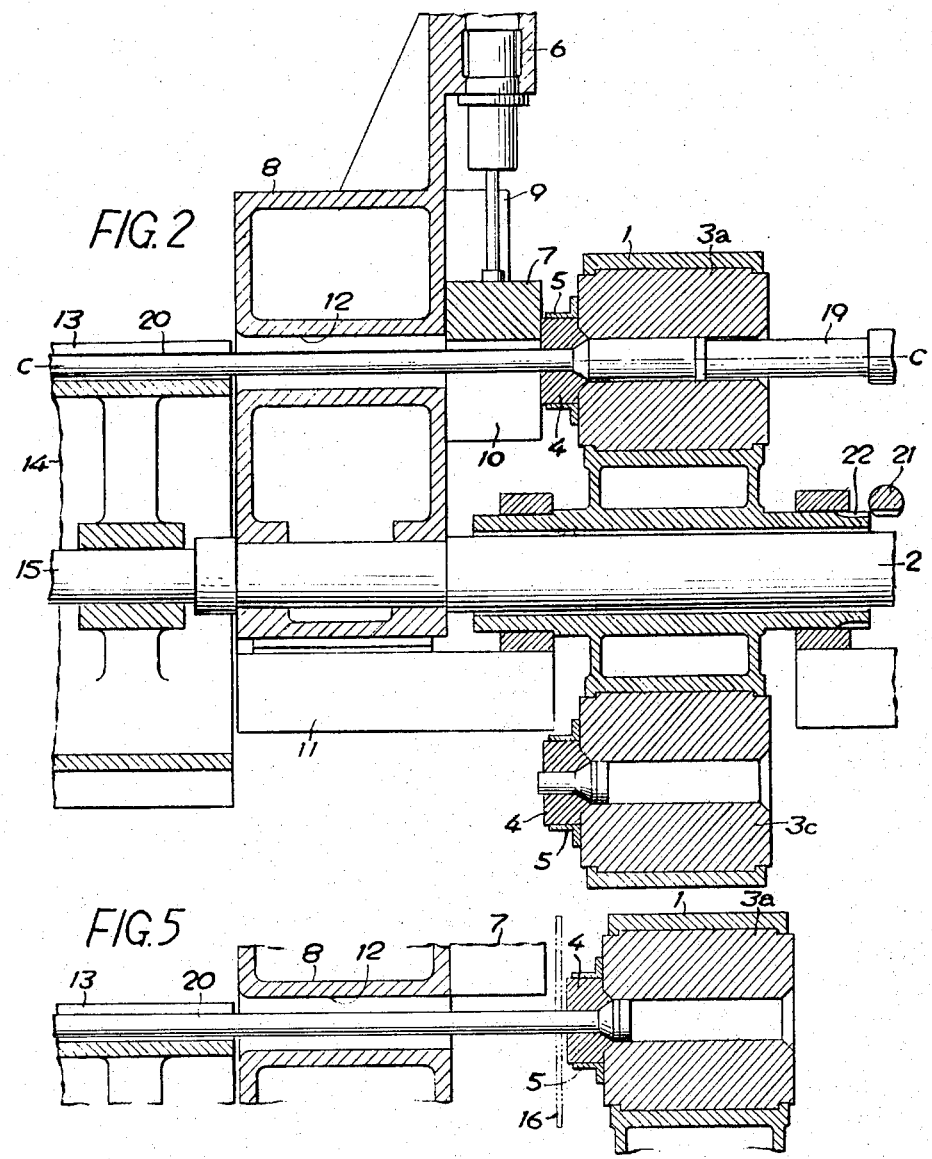
FIG. 2 is a longitudinal section of the same.
Figure 3:
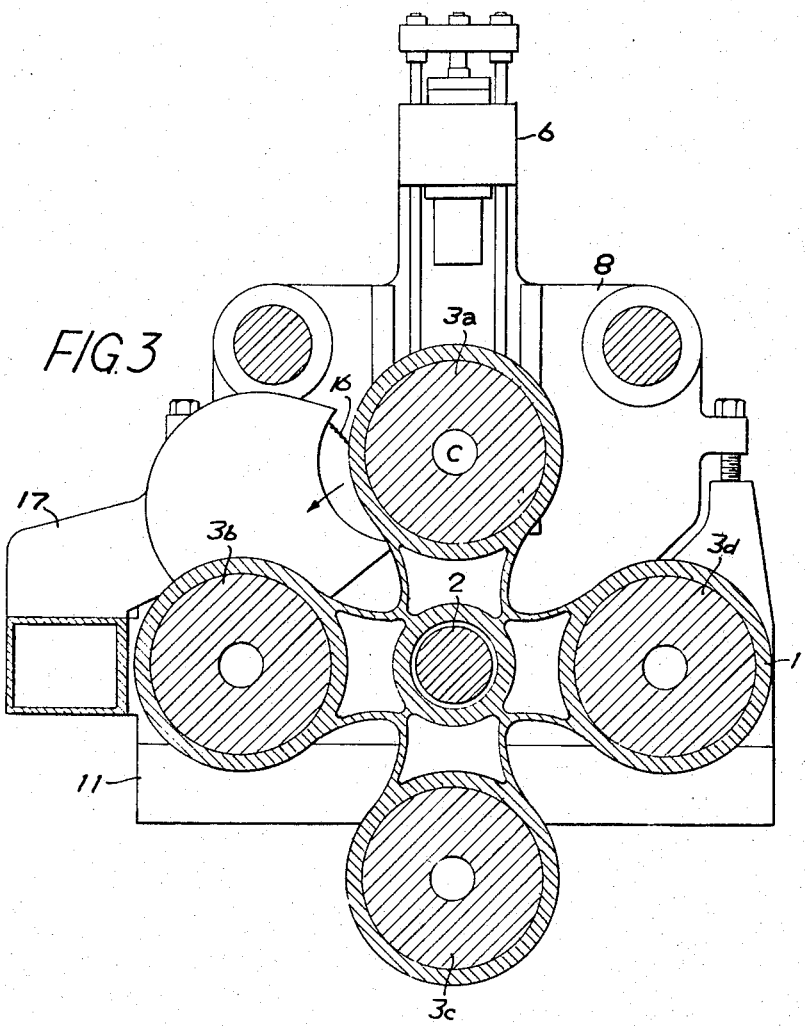

In FIG. 1, the extruding part of a metal extruding press is shown. A container holder 1 is adapted to be rotatable around the axis of a shaft 2 in a vertical plane and has a plurality (four in the illustrated example) of containers 3a, 3b, 3c and 3d attached to the outer periphery thereof, the rotation of said holder causing the containers to be successively brought into alignment with the central axis of extrusion C. The driving of the holder 1 may be effected by a hydraulically operated rack 21 through an associated pinion 22 (FIG. 2). A die holder 5 for receiving a die 4 is shown as attached to the front surface of each container. But such die holders 5 may, of course, be separated from the containers so as to be capable of varying their positions and holding a plurality of dies. In the center axis of extrusion C, there is provided in front of the die 4 a wedge 7 vertically reciprocated as by a suitable hydraulic means as shown in FIG. 3, the vertical reciprocation of said wedge being controlled by vertically arranged guides 9, 9. The wedge 7 is provided with an inverted U-shaped opening 10 directed downward. An opposed frame 8 is positioned in front of the container holder and serves to sustain the extrusion force, said frame 8 being mounted on a frame 11. The opposed frame 8 is provided with an arcuate elongated opening 12 with its arcuate axis extending transversely of the center axis of extrusion C along an arc A—A described by the center of each container when rotated by the container holder 1. Thus, one end of the elongated opening will horizontally align at the center axis of extrusion C with the opening 10 in the wedge 7 when the latter is in its lowered position, as shown in FIG. 3. Provided in front of the opposed frame 8 so as to be rotatable around the axis of a shaft 15, is a gear-shaped carrier block 14 having a number of longitudinally extending grooves 13 formed in the outer periphery thereof. The carrier block 14 may be of the freely rotatable type, or it may be driven synchronously with the container holder 1. The angle between adjacent grooves 13 in the carrier block 14 corresponds to the length of the elongated opening 12. Further, a suitable driving means 17 is attached to the frame 11 so that a cutting saw 16 may be positioned in a vertical plane at a short distance ahead of the dies 4 with the blade of the saw overlapping the adjacent terminal end portion of the elongated opening 12. The positional relation between the elongated opening 12 and the blade of the saw 16 as viewed from front is as shown in FIGS. 4 and 5.

In operation of the invention, use being made of a movable type container holder and the container 3a being located at the center axis of extrusion C and having been charged with a billet 18, a stem 19 presses the billet so that the latter is forwardly extruded through the die 4 supported by the wedge 7, the thus extruded material 20 being passed through the elongated opening 10 in the wedge 7 and then through the initial end portion of the elongated opening 12 in the opposed frame 8 into the upper groove 13 in the carrier block 14. Upon the completion of extrusion, the container is retracted in a suitable degree, as shown in FIG. 5, whereupon the wedge 7 is pulled upward, followed by the rotation of the container holder 1 in the direction of arrow shown in FIG. 3 whereby as best shown in FIG. 4, the extruded material 20 carried by the block 4 is moved within the elongated opening 12 in a direction normal to the direction of extrusion along the arc A—A to reach the cutting saw 16, where the extruded material 20, while being moved, is cut by the saw as the latter is rotating in the fixed position. The extruded material thus cut is forwardly drawn out along the groove 13 in the carrier block 14, while the extrusion remnant in the die 4 is suitably discharged therefrom. Thereafter, the above-mentioned extruding and cutting operations are repeated.

From the foregoing description, it is understood that according to the invention after the completion of each extrusion operation, the extruded material together with the container is moved in a direction normal to the direction of extrusion, during which movement the extruded material is cut and separated from the extrusion remnant, so that no additional time is required for cutting the extruded material and, therefore, the cycle of extrusion is correspondingly reduced thereby increasing the efficiency of extrusion. Further, according to the invention, since the cutting machine used is of the stationary type, an additional advantage is obtained in that unlike a conventional movable type cutting machine, there is no need of providing complicated mechanisms.

What I claim is:

1. A method of cutting extruded materials on a movable container type metal extruding press, wherein use is made of a press having a plurality of containers attached to a container holder, said containers being moved after the completion of each operation of extrusion toward the center axis of extrusion to effect the next extrusion, the extruded material being cut between it and the extrusion remnant, said method being characterized by the steps of
   (a) moving the container, with extruded material extending therefrom, in a direction normal to the direction of extrusion, and
   (b) cutting the extrusion from the container and the remnant therein during the movement being imparted thereto by step (a).

2. An apparatus for cutting extruded materials on a movable container type metal extruding press, comprising an opposed frame positioned in front of a rotatable container holder having a plurality of containers, said opposed frame being formed with an elongated opening extending transversely of the central axis of extrusion along an arc coinciding with the locus described by the rotation of said container, and a stationary cutting machine mounted in a fixed position in such a manner that the cutting blade thereof overlaps the terminal end portion of said elongated opening.

3. An apparatus as claimed in claim 2 wherein a gear-shaped carrier block having a plurality of longitudinally extending grooves is rotatably arranged in front of said frame.

References Cited
UNITED STATES PATENTS
3,147,863  9/1964  Rosenthal _____ 72—255
3,156,359  11/1964  Elger _____ 72—255

FOREIGN PATENTS
782,598  9/1957  Great Britain.

RICHARD J. HERBST, *Primary Examiner.*

K. C. DECKER, *Assistant Examiner.*